(No Model.) 2 Sheets—Sheet 1.
F. E. KINSMAN.
ELECTRICALLY OPERATED ICE CUTTING MACHINE.
No. 412,925. Patented Oct. 15, 1889.
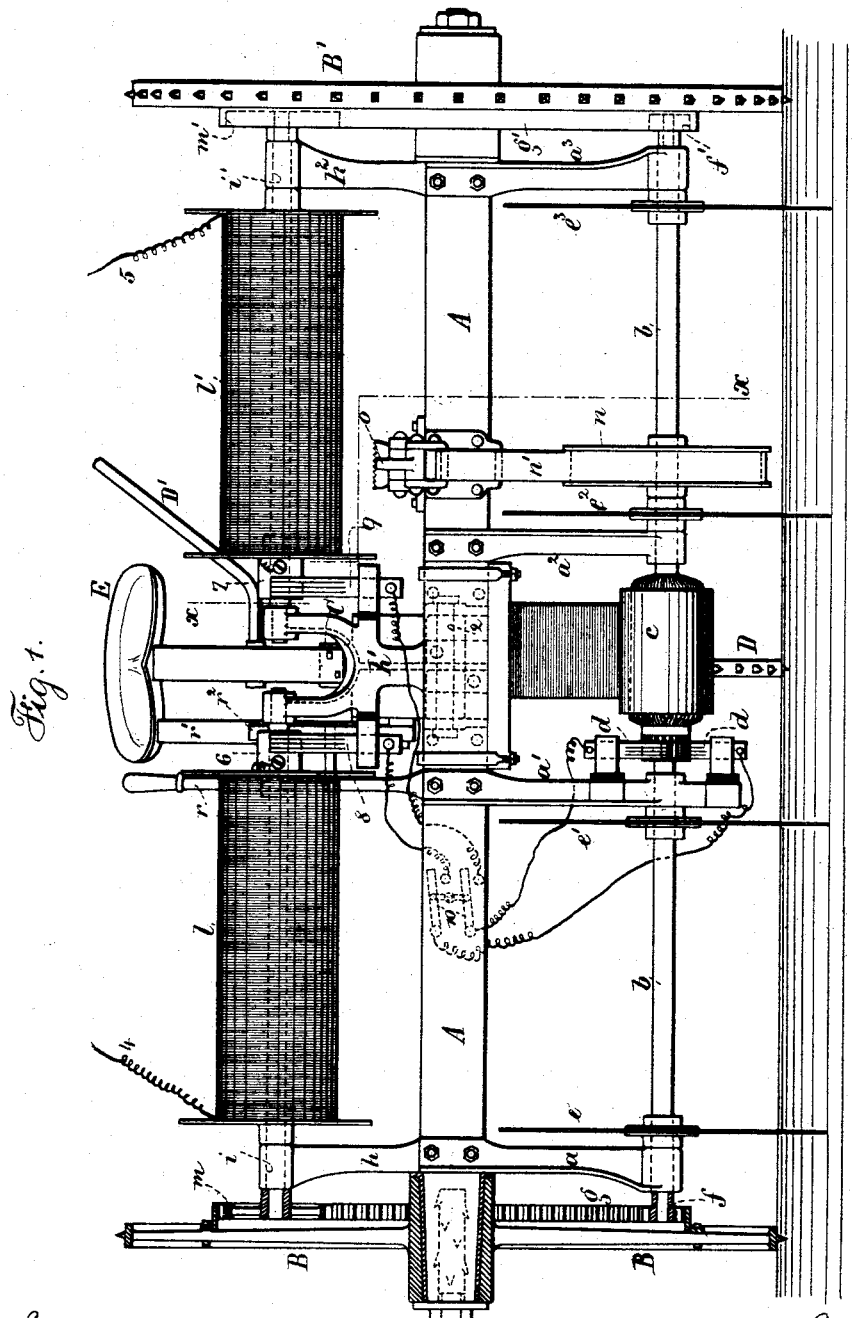
Witnesses:
J. Staib
Chas. H. Smith
Inventor:
Frank E. Kinsman
per Lemuel W. Serrell atty (No Model.) 2 Sheets—Sheet 2.
F. E. KINSMAN.
ELECTRICALLY OPERATED ICE CUTTING MACHINE.
No. 412,925. Patented Oct. 15, 1889.
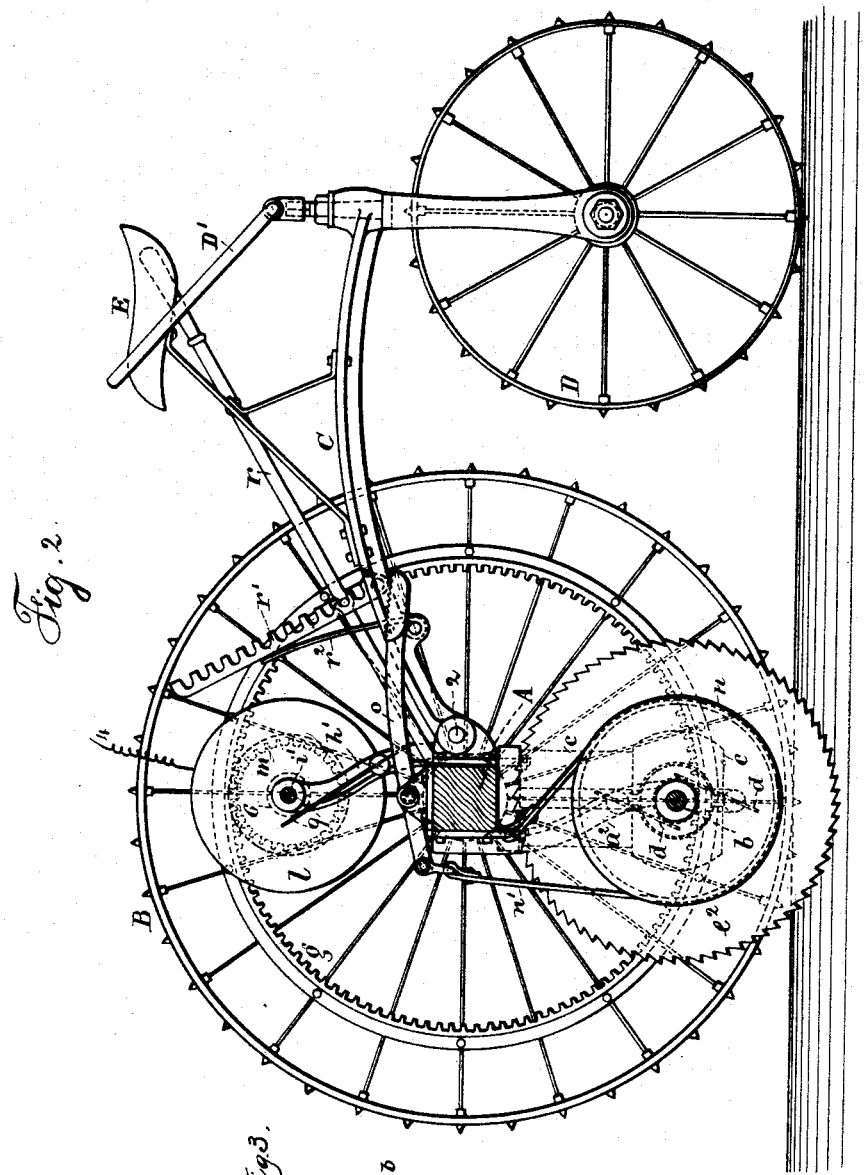
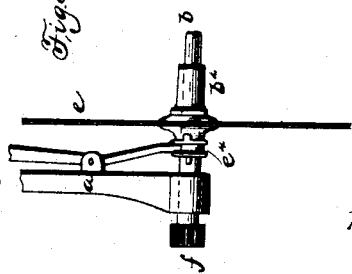
Witnesses:
J. Stait
Chas. H. Smith
Inventor:
Frank E. Kinsman
per Lemuel W. Serrell Atty

UNITED STATES PATENT OFFICE.

FRANK E. KINSMAN, OF PLAINFIELD, NEW JERSEY.

ELECTRICALLY-OPERATED ICE-CUTTING MACHINE.

SPECIFICATION forming part of Letters Patent No. 412,925, dated October 15, 1889.

Application filed November 2, 1888. Renewed September 7, 1889. Serial No. 323,232. (No model.)

*To all whom it may concern:*

Be it known that I, FRANK E. KINSMAN, of Plainfield, in the county of Union and State of New Jersey, have invented an Improvement in Ice-Cutting Machines; and the following is declared to be a full, clear, and exact description of the same.

The cutting of ice upon ponds and rivers is accomplished by means of an ice-cutting machine drawn by horses over the surface of the ice and guided by a driver, and these machines, by a sprocket-wheel moved by contact with the ice and through a series of gears, operate a revolving saw, which, as the machine moves over the surface of the ice, cuts a groove or kerf into the surface of the ice, and by means of such machines the ice is cut into strips, and the strips into blocks, to be broken up afterward by hand-tools; but this method of cutting is slow and expensive.

My invention relates to an ice-cutting machine which is electrically driven over the surface of the ice and in which a gang of saws is rotated by an electric motor.

I employ in carrying out my invention an axle, and spiked wheels upon the ends of such axle, an electric motor suspended from said axle, a gang of saws mounted upon the armature-shaft of the motor, said armature-shaft being in bearings below the main axle and upon the ends of the armature-shaft pinions, which mesh with teeth upon the inner surfaces of toothed rings secured upon the inner faces of the main wheels, and I employ drums or reels and bearings for the same above the axle, and the shafts of the drums have pinions upon their outer ends, which pinions also mesh with the toothed rings upon the wheels, and these reels or drums carry electric conducting-wires, which lead to the shore to a source of electric supply, and I provide means for stopping the armature-shaft and for raising the gang of saws out of the ice, and means for changing the direction of the machine, all of which are more particularly hereinafter described.

In the drawings, Figure 1 is an elevation, partially in section, of my improved device. Fig. 2 is a sectional elevation of the same at the line $x\ x$ of Fig. 1, and Fig. 3 is a detached view of a modification in the manner of mounting the saws.

A represents the main axle, which is preferably of wood, and upon the ends of said axle are the wheels B B', which wheels are of similar construction to those employed in agricultural implements, and upon their peripheries there are projections or penetrating points which prevent the wheels slipping upon the surface of the ice. C represents a spine pivotally connected to the main axle at 2. D is the steering-wheel in jaws that are pivotally mounted at the end of the spine C, and D' represents an arm by which such wheel is turned in guiding the machine, the arm being moved by a person sitting upon the seat E.

$a\ a'\ a^2\ a^3$ represent arms or hangers extending below the main axle and bolted thereto, the ends of said arms or hangers having bearings for the shaft $b$. The electric motor $c$ is suspended from the main axle A in any desirable manner, the shaft of the armature of the electric motor being continued as the shaft $b$. This electric motor may be of any desired or well-known character, the armature-shaft being provided, as usual, with commutator-plates for the brushes $d$.

The saws $e\ e'\ e^2\ e^3$, composing the gang of saws, are of usual circular shape and are mounted equidistant upon the shaft $b$, and upon the ends of the shaft $b$ there are pinions $f\ f'$, and said pinions mesh with the toothed rings $g\ g'$, which are secured upon the inner faces of the spokes of the main wheels B B'. The saws $e$ may be mounted upon a tubular shaft $b^2$ (see Fig. 3) around the armature-shaft $b$, and be connected with the shaft $b$ by a clutch $e^4$. This would provide for driving the machine without driving the gang of saws.

Connected to and rising above the main axle are the arms $h\ h'\ h^2$, having bearings at their upper ends and supporting the shafts $i\ i'$, and the drums or reels $l\ l'$, which are mounted upon said shafts, and upon the outer ends of said shafts $i\ i'$ there are pinions $m\ m'$, which pinions also mesh with the toothed rings $g\ g'$, and around said drums are wound insulated electric conducting-wires 4 5, which wires extend to a source of electric supply or a station upon the shore, and the inner ends of said conducting-wires are passed through the drum-heads and secured to metal insulated sleeves 6 7 upon the shafts $i\,i'$, and I provide metal plates 8 9, similar to commutator-brushes. One end of each plate is supported upon an insulated block projecting from the frame $h'$, and the other ends of these plates 8 9 bear against the respective sleeves 6 7, and from the plates 8 9 electric conducting-wires extend to a switch 10, and from the switch 10 said conducting-wires pass to the commutator-brushes $d$ of the electric motor.

I provide a friction-wheel $n$ upon the shaft $b$, and a band $n'$, connected at one end to the main axle A and extending around the wheel $n$, and the other end is attached to one end of the lever $o$, by means of which lever the band $n'$ can be tightened around the friction-wheel to quickly stop the rotation of the armature-shaft and the movement of the machine.

I provide a lever $r$, connected to the main axle A, and a toothed rack $r'$ and spring $r^2$, the object of which is to provide a means for raising the saws out of the ice, and this is accomplished by pushing the handle forward and giving the main axle a partial rotation, and engaging the tooth or stud upon the lever $r$ with the teeth on the rack $r'$, to swing the gang of saws rearwardly and upwardly and hold the parts in position, as it is necessary when the machine is not cutting the ice that the saws should be raised off the ground or ice, so that the teeth of the same will not strike as the machine is moved from place to place.

The operation of my improved device is as follows, presuming that the same is started upon the edge of a sheet of ice to cut the same: The electric current from a source of supply is passed through the electric wires 4 5, through the coils upon the drum, through the metal plates 8 9, and through conducting-wires from said plates to the commutator-brushes $d$. The electric current acts to revolve the motor, its shaft $b$, and the gang of saws $e\,e'\,e^2\,e^3$ and the pinions $f\,f'$, which latter turn the toothed rings $g\,g'$ and the main wheels B B′, and so move the machine forward. The rings $g\,g'$ act to revolve the pinions $m\,m'$ and their shafts $i\,i'$ and drums $l\,l'$ and unwind the electric conducting-wires 4 5 as the machine moves forward, the saws cutting the grooves or kerfs in the ice to the required depth. If it is desired to stop the machine, the lever $o$, band $n'$, and band-wheel $n$ are brought into requisition after the switch 10 has been moved and the current broken. If it is desired to guide or change the direction of the machine, the steering-wheel D and its lever-handle D′ are employed by the person sitting upon the seat E. If it is desired to raise the saws out of the ice, the hand-lever $r$ and toothed rack $r'$ are employed to give the axle a partial rotation and lift the saws and hold the parts to place.

I remark that any number of saws may be employed upon the shaft $b$, so as to cut grooves or kerfs in the ice at any desired distances apart, and this will not necessitate a change in the other details of the machine, the power of the electric motor governing the number of saws which the armature is capable of rotating.

The steam-plant usually employed for hoisting ice at large establishments can be utilized to drive the machinery at a station to generate electricity for operating my improved cutting-machines.

I claim as my invention—

1. The combination, with the main axle and supporting-wheels, of a shaft and saws on such shaft, and an electric motor for rotating the shaft and saws, and gearing connecting the shaft and the supporting-wheels, substantially as specified.

2. The combination, with the main axle and supporting-wheels, of a shaft and gang of saws, and electric motor for rotating said shaft and saws, and pinions upon the ends of the saw-shaft, and toothed rings upon the main wheels meshing with each other for revolving the main wheels, substantially as specified.

3. The combination, with the main axle and supporting-wheels, of hangers connected to the main axle and extending downwardly and provided at their ends with bearings, an electric motor supported from the main axle, the shaft of whose armature is extended at one or both ends and supported in the bearings of the hangers, saws forming a gang mounted upon the armature-shaft, arms extending above the main axle, shafts and drums or reels supported by said arms, electric conducting-wires 4 5, leading from a source of supply to and around said drums, and electric connections from said wires to the electric motor, substantially as set forth.

4. The combination, with the main axle and supporting-wheels and an electric motor $c$, supported by said axle, of the armature-shaft $b$, the gang of saws connected therewith, and bearings for said shaft, the pinions $f\,f'$, the toothed rings $g\,g'$, connected to the main wheels, the shafts $i\,i'$ and supports for the same, the drums $l\,l'$, and the pinions $m\,m'$, whereby the rotation of the electrically-revolved shaft turns the main wheels and the electric-conductor drums, substantially as set forth.

5. The combination, with the main axle and supporting-wheels, of the electric motor and a switch, a gang of saws mounted upon the armature-shaft, a spine C, pivoted to the main axle, a steering-wheel and lever-handle, a lever and friction-wheel for stopping the armature-shaft, and a hand-lever for elevating the gang of saws by giving a partial rotation to the axle, substantially as set forth.

6. The combination, with the main axle and wheels, the electric motor, and the drums and the electric conducting-wire, of the insulated sleeves 6 7, the metal plates 8 9, the switch 10, and the conducting-wires connecting the insulated sleeves and the electric motor, and the gearing for connecting the drums to the supporting and propelling wheels, substantially as set forth.

Signed by me this 29th day of October, 1888.

FRANK E. KINSMAN.

Witnesses:
GEO. T. PINCKNEY,
WILLIAM G. MOTT.